May 14, 1968  V. C. H. RICHARDSON  3,383,122
ANGULAR BREAKAWAY PIPE JOINT
Filed June 22, 1966  2 Sheets-Sheet 1

Vernon C. H. Richardson
INVENTOR.

BY
Browning, Simms, Hyer & Eckenrodt
ATTORNEYS

May 14, 1968   V. C. H. RICHARDSON   3,383,122
ANGULAR BREAKAWAY PIPE JOINT
Filed June 22, 1966   2 Sheets-Sheet 2

Vernon C. H. Richardson
INVENTOR.

BY
ATTORNEYS

United States Patent Office 3,383,122
Patented May 14, 1968

3,383,122
ANGULAR BREAKAWAY PIPE JOINT
Vernon C. H. Richardson, Houston, Tex., assignor, by mesne assignments, to the United States of America as represented by the National Science Foundation
Filed June 22, 1966, Ser. No. 559,591
8 Claims. (Cl. 285—1)

This invention relates generally to a joint for connecting together two pipe sections, and in particular to such a joint that will release the connection when the pipe sections are misaligned a predetermined amount.

When drilling under offshore waters from a floating drilling vessel, the wellhead equipment, casing hangers, blowout preventers, etc., are often located adjacent the bottom of the water with a riser pipe extending from the wellhead equipment to the floating drilling vessel. The riser pipe guides the drill pipe into the well bore and provides a return conduit for the drilling fluid circulated through the drill pipe. With the riser pipe fixed to the wellhead equipment at one end and connected to the vessel at the other, it is subject to large bending stresses unless the drilling vessel is maintained on station above the well bore. Usually, this presents no problem during good weather. Should a storm arise, however, it may become difficult to maintain the ship's station and there is the danger that the vessel may be moved off station far enough to break the riser pipe. The angular displacement of the vessel from vertical alignment from the well bore determines the stresses in the riser pipe.

Therefore, it is an object of this invention to provide an angular breakaway pipe joint for connecting together two sections of a pipe string that will release the two sections, when they have moved out of axial alignment a predetermined amount.

It is another object of this invention to provide a pipe joint between two pipe sections that will not release due to axial loading of the joint but which will quickly disconnect the two pipe sections when they have become misaligned a predetermined amount in any direction.

It is yet another object of this invention to provide a ball and socket type joint for connecting together two sections of a pipe string to allow free pivotal movement of one section relative to another and which will disconnect the joint when the angle between the longitudinal axes of the sections reaches a predetermined amount.

Figure 1:
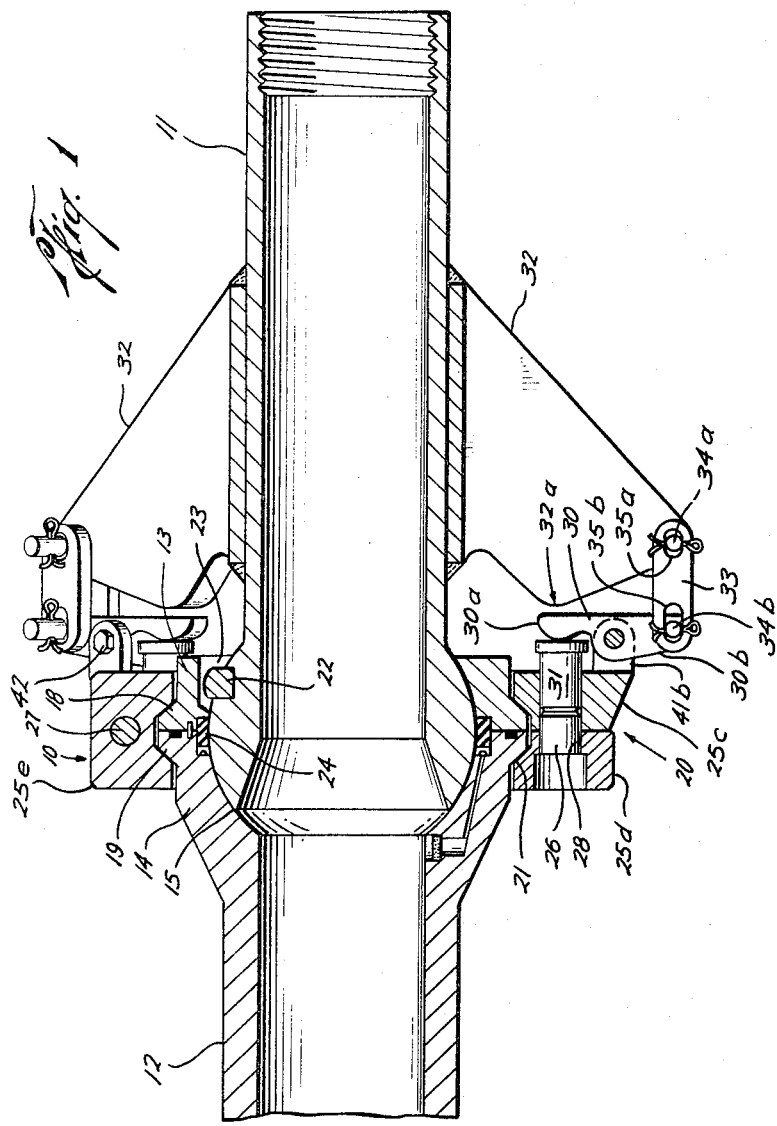
Figure 2:
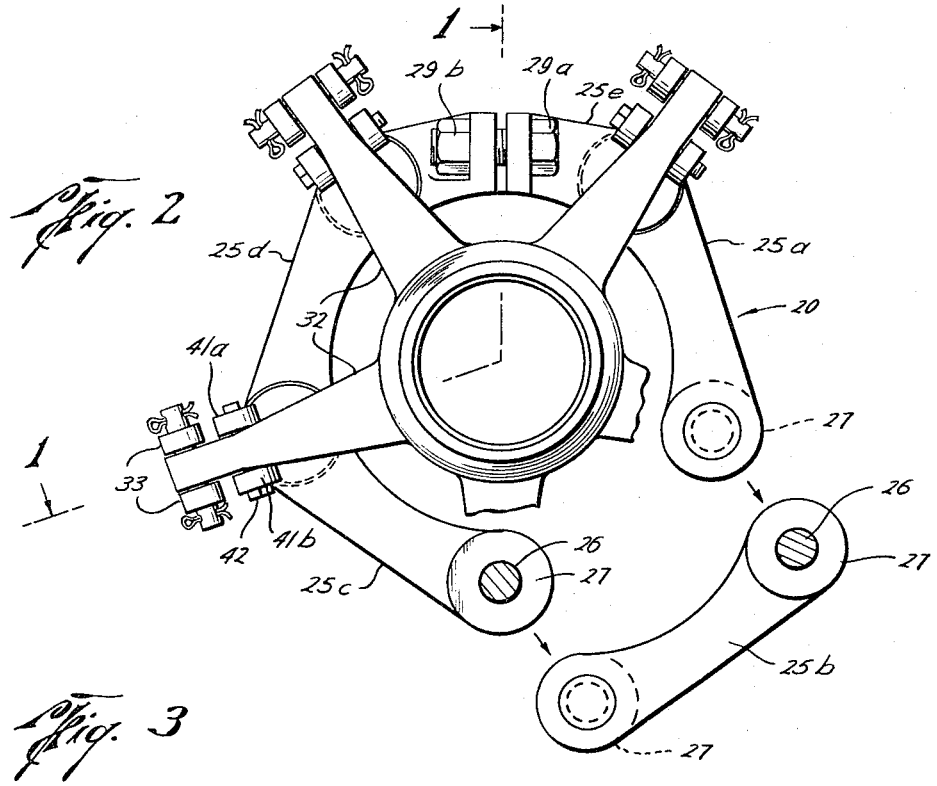
Figure 3:
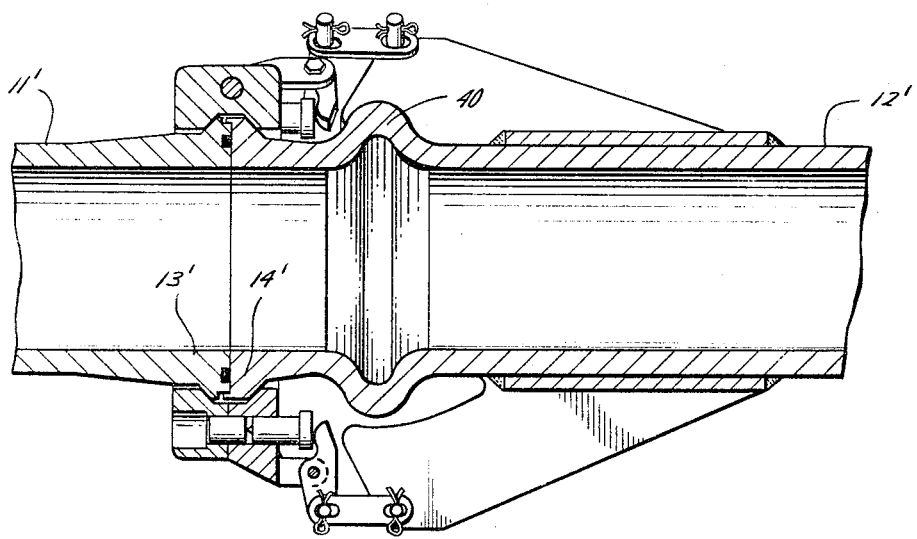

These and other objects, advantages, and features of the invention will be apparent to those skilled in the art from a consideration of this specification and attached drawings, in which, FIGURE 1 is a vertical sectional view through a ball and socket joint constructed in accordance with this invention;

FIGURE 2 is a sectional view taken along line 2—2 of FIGURE 1 with a portion of the structure of the release mechanism disassembled; and FIGURE 3 is a vertical sectional view of an alternate embodiment of the invention to provide a rigid connection between two pipe sections.

In FIGURES 1 and 2, the pipe joint, indicated generally by the number 10, connects pipe sections 11 and 12. The pipe joint includes two abutting end rings 13 and 14, which are connected to pipe sections 11 and 12, respectively. End ring 14 is integrally connected to pipe section 12. It has a spherically shaped inner surface 15, which forms a portion of the socket provided to receive ball 16. The ball is integrally attached to pipe section 11. End ring 13 has spherically shaped inner surface 17 which forms the remainder of the socket in which ball 16 is located and confined. The interengagement of surface 17 and the ball attaches ring 13 to pipe section 11.

Each end ring is provided with an outwardly extending protrusion. In the embodiment shown, such protrusions are annular flanges 18 and 19, which are integrally attached to end rings 13 and 14, respectively. Encircling the end rings is annular collar 20 which has an annular internal cavity 21 in which protrusions 18 and 19 extend. Annular collar 20 then holds the end rings in abutting relationship and thereby combines with the end rings and the ball to connect together pipe sections 11 and 12. With this arrangement, pipe section 11 can pivot in any direction relative to pipe section 12. Key 22 is carried by ball 16 and engages key slot 23 in end ring 13 to prevent relative rotation between the pipe joints. Seal 24 prevents the escape of fluid from between the ball and socket.

Annular collar 20 is made up a plurality of link members 25a–25e. Each link is connected to the adjacent link by a disruptable connection. In the embodiment shown, a plurality of link pins 26 provides this connection. Each link member has end sections 27 of reduced thickness, which overlap a similar section on the end of the adjacent member. Each of such end sections of reduced thickness has a hole 28 to receive one of the link pins 26. Thus, each link pin, as shown in FIGURE 1, is located in aligned holes in the overlapping ends of each two adjacent link members to pivotally connect the link members together. With the link members so connected together, they form an articulate collar for encircling end rings 13 and 14. To permit the collar to be connected around the end rings, link 25e is split and provided with draw bolt 29a and nut 29b for tightening the collar around the end rings. Preferably, protrusions 18 and 19 on the end rings are wedged shaped in cross section and cavity 21 in the collar has outwardly tapered surfaces so that tightening of the draw bolt will pull the abutting end rings together with a wedging action.

In accordance with this invention, means are attached to one of the pipe sections to disrupt at least one of the disruptable link connections and release the collar from around the end rings to disconnect the joint, when the pipe sections move out of axial alignment a predetermined amount. In the embodiment shown, a plurality of levers 30 are pivotally mounted on collar 20. Each lever is pivotally mounted on shoulder bolt 42, which extends between spaced lugs 41a and 41b on each link member. Means are provided to operatively connect one end of each lever with one of the link pins. In the embodiment shown, ram pins 31 are located in holes 28 between the link pins and one end of levers 30. Thus, downward movement of this end of a lever will cause a ram pin to move a link pin out of engagement with one of the link members and release the collar from around the end rings of the joint.

Means are provided to so move at least one of the levers, when the pipe sections have moved out of axial alignment a predetermined amount. In the embodiment shown, radially extending plates or flange members 32 are attached to pipe section 11 and extend outwardly over the levers. The arrangement of each radially extending member and its associated lever is the same. Therefore, only the apparatus for disrupting the connection between links 25c and 25d will be described. This is the connection shown in the right hand side of FIGURE 1.

Radial plate or member 32 has a lower edge surface 32a located just above end 30a of lever 30. As the pipe sections move out of alignment in the direction of this radial plate, surface 32a will move into engagement with end 30a of lever 30 which, with further movement of the plate, will cause ram pin 31 to push link pin 26 out of engagement with link 25b. Thus, the space between plate 32 and lever 30 plus the distance the ram pin must push the link pin to disrupt the connection determines the distance the pipe sections can move out of alignment before the joint is released.

Means are also provided to operate one or more levers 30 and disrupt a connection between the links of the collar when the pipe moves away from the lever. In the embodiment shown, pivot arms 33 are pivotally connected to plate 32 and the outer end of the lever 30. The pivot arms are located on opposite sides of the plate and lever and are connected to these two members by pivot pins 34a and 34b. The pivot pins extend through the plate 32 and lever 30, respectively, and through openings 35a and 35b, respectively, in arm 33. Opening 35b is elongated to allow the plate to move down toward lever 30 far enough to move link 26 out of engagement with one of the link members without being stopped by arm 33. As the plate is moved away from lever 33, however, link 33 will cause the lever to perform in the same manner as it did before, by moving its outer end 30b, upwardly with member 32. The amount slot 35b is elongated will depend on the distance member 32 has to move toward the lever in order to disrupt the connection. Preferably, arm 32, the lever, and link arms 33 are designated so that regardless of the direction that the pipe moves, when moving out of alignment, at least two levers will be pivoted. The disruption of one connection, of course, is all that is necessary to allow the collar to release the two end sections and disconnect the joint between the two sections of pipe.

In the embodiment shown in FIGURE 3, a rigid connection is provided between the two pipe sections. Here end rings 13' and 14' are integrally connected to pipe joints 11' and 12'. The apparatus for releasing the joint for a predetermined misalignment of the pipe sections is identical to that described in connection with FIGURES 1 and 2.

With this type connection, the bending of the pipe section will be distributed along the pipe. In some instances, enough bending may occur at the joint to actuate the breakaway apparatus before the stresses in the pipe exceed its yield point. In other instances, however, it may be desirable to have a large portion of the bending occur at the joint. In the embodiment shown, means are provided to do this comprising bellows-like convolution 40 in pipe section 12' and located adjacent its upper end. Such a convolution will tend to concentrate the bending of the pipe sections at the joint. Then by determining the amount of bending produced by the maximum allowable stress, the releasing apparatus can be adjusted accordingly.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be intepreted as illustrative and not in a limiting sense.

The invention having been described, what is claimed is:

1. An angular breakaway pipe joint for connecting together the adjacent ends of two sections of pipe and for releasing the connection therebetween when the pipe sections move out of axial alignment a predetermined amount, said joint comprising, two abutting end rings, each ring being connected to one of the pipe sections and equipped with outwardly extending protrusions, an annular collar encircling the end rings having a cavity into which the protrusions extend to hold the two end rings in abutting relationship, said collar comprising a plurality of link members connected together by a plurality of disruptable connections, and means attached to one of said pipe sections to disrupt at least one of the disruptable link connections and release the collar from around the end rings to disconnect the joint when the pipe sections move out of axial alignment a predetermined amount.

2. The pipe joint of claim 1 in which the disruptable connections of the collar include a plurality of link pins, each pin being located in aligned holes in the adjacent ends of two collar links to pivotally connect the two links of the collar together.

3. The pipe joint of claim 2 in which the means for disrupting at least one of the disruptable link connections includes means for moving at least one of the link pins axially out of engagement with one of the link members it connects when the pipe sections have moved out of alignment the predetermined amount.

4. The pipe joint of claim 3 in which the means for disrupting at least one of the link connections further includes, a plurality of levers, means pivotally mounting each lever intermediate its ends, means operatively connecting one end of each lever to a link pin to move the pin axially as the lever is pivoted, and means carried by one of the pipe sections for pivoting at least one of the levers to move the link pin operatively connected thereto out of engagement with one of the link members to disrupt the connection between the link members and release the joint between the pipe sections when the pipe sections move out of alignment the predetermined amount.

5. The pipe joint of claim 4 in which the means for moving the levers includes a plurality of radially extending members attached to one of said pipe sections and positioned so one member will engage the end of one of the levers when the pipe joints are moved out of alignment the predetermined amount in any direction and disrupt one of the disruptable connections of the collar and release the joint.

6. The pipe joint of claim 5 further provided with means connecting each radial member with one of the levers to operate the lever to disrupt the disruptable connection when the member is moved away from the lever by the predetermined amount of misalignment of the pipe sections.

7. The pipe joint of claim 5 further provided with a ball and socket connection between the pipe sections to allow free pivotal movement of one section relative to the other.

8. The pipe joint of claim 6 in which one pipe section is provided with a bellows type corrugation of increased diameter adjacent the joint to locate most of the misalignment of the pipe sections across the corrugation when the sections are subjected to bending stresses.

References Cited

UNITED STATES PATENTS

| | | | |
|---|---|---|---|
| 377,075 | 1/1888 | Jacob | 285—307 X |
| 466,340 | 1/1892 | Gold et al. | 285—1 |
| 2,452,430 | 10/1948 | Clark et al. | 285—1 |
| 2,649,314 | 8/1953 | Richardson | 285—33 |
| 2,699,961 | 1/1955 | Omon et al. | 285—1 X |
| 2,701,147 | 2/1955 | Summerville | 285—1 |
| 2,904,353 | 9/1959 | Brickhouse | 285—33 |

EDWARD C. ALLEN, *Primary Examiner.*

DAVE W. AROLA, *Assistant Examiner.*